(12) United States Patent
Yamashita et al.

(10) Patent No.: US 10,071,783 B2
(45) Date of Patent: Sep. 11, 2018

(54) SADDLE-RIDE VEHICLE

(71) Applicant: HONDA MOTOR CO., LTD., Minato-Ku, Tokyo (JP)

(72) Inventors: Akihiro Yamashita, Wako (JP); Yuzuru Ishikawa, Wako (JP); Toru Ukawa, Wako (JP); Daisuke Umikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 87 days.

(21) Appl. No.: 15/239,535

(22) Filed: Aug. 17, 2016

(65) Prior Publication Data

US 2017/0088226 A1 Mar. 30, 2017

(30) Foreign Application Priority Data

Sep. 28, 2015 (JP) .................................. 2015-189079

(51) Int. Cl.
  *F02B 77/00* (2006.01)
  *B62K 11/04* (2006.01)
  *F02F 7/00* (2006.01)
  *F02B 61/02* (2006.01)

(52) U.S. Cl.
  CPC .............. *B62K 11/04* (2013.01); *F02F 7/006* (2013.01); *F02F 7/0021* (2013.01); *F02F 7/0082* (2013.01); *F02B 61/02* (2013.01)

(58) Field of Classification Search
  CPC ......... B62K 11/04; F02F 7/006; F02F 7/0021; F02F 7/0082; F02B 61/02
  See application file for complete search history.

(56) References Cited

U.S. PATENT DOCUMENTS

| | | | |
|---|---|---|---|
| 4,323,135 A | 4/1982 | Tominaga et al. | |
| 5,109,943 A * | 5/1992 | Crenshaw | B60K 5/125 123/195 A |
| 6,758,299 B2 * | 7/2004 | Ito | F02B 61/02 123/193.1 |
| 8,096,381 B2 | 1/2012 | Castellani et al. | |
| 2007/0069545 A1 * | 3/2007 | Katagiri | B62J 17/02 296/78.1 |

FOREIGN PATENT DOCUMENTS

| | | |
|---|---|---|
| JP | 2009-292467 A | 12/2009 |
| JP | 2010-023732 A | 2/2010 |
| WO | 2015/070216 A2 | 5/2015 |

* cited by examiner

*Primary Examiner* — Hung Q Nguyen
(74) *Attorney, Agent, or Firm* — Carrier Blackman & Associates, P.C.; Joseph P. Carrier; Jingli Wang

(57) ABSTRACT

In a saddle-ride type vehicle in which a cylinder includes a cylinder head and a cylinder head cover that covers an upper portion of the cylinder head, a vehicle body frame includes a head cover adjoining portion that adjoins the cylinder head cover. At least a part of the cylinder head cover overlaps the head cover adjoining portion as viewed from a direction along a cylinder axis that is a center axis of the cylinder. The head cover adjoining portion extends rearward such that the cylinder head cover is exposed outside in a side view. The foregoing configuration seeks to affect the ease of mounting and dismounting a saddle-ride vehicle having a power unit with a cylinder arranged upward and the vehicle body frame for supporting the power unit by reducing the left-right width of a vehicle body frame while allowing a cylinder head cover to be attachable and detachable.

14 Claims, 7 Drawing Sheets

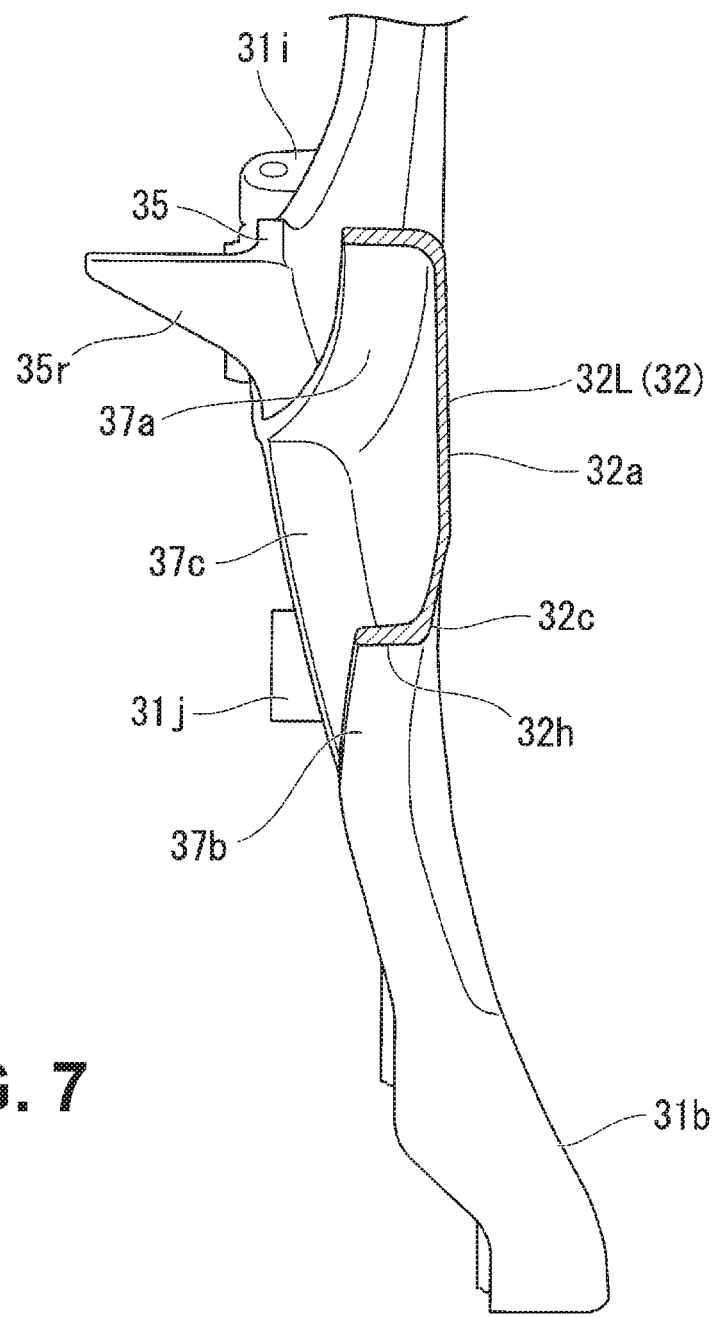
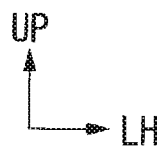

SADDLE-RIDE VEHICLE

CROSS-REFERENCE TO RELATED APPLICATIONS

The present disclosure claims priority under 35 USC 119 based on Japanese Patent Application No. 2015-189079, filed on Sep. 28, 2015. The entire subject matter of this priority document, including specification claims and drawings thereof, is incorporated by reference herein.

BACKGROUND

Conventionally, saddle-ride type vehicle are exemplified by the disclosure provided in Japanese Patent Application Publication No. 2009-292467. In this saddle-ride type vehicle, a frame divided into front and rear parts (specifically, a box-like body and a saddle support) is connected to a cylinder of an engine. This saddle-ride type vehicle does not have a seat rail supporting a seat that allows an occupant to be seated.

Additionally, there is a case where such a saddle-ride type vehicle is provided with the seat rail connected to the frame divided into the front and rear parts. In this case, it is necessary to prevent a cylinder head cover from interfering with the seat rail when the cylinder head cover is attached to or detached from a cylinder head of the cylinder. To accommodate the cylinder head cover, the left-right width of the seat rail needs to be made larger than the left-right width of the cylinder head cover, which causes a problem against improvement of the ease of mounting and dismounting for the occupant.

An object of the present disclosure is to provide a saddle-ride type vehicle including a power unit with a cylinder arranged upward and a vehicle body frame supporting the power unit, and being designed to improve the ease of mounting and dismounting for the occupant by reducing the left-right width of the vehicle body frame while making the cylinder head cover attachable and detachable.

SUMMARY

For the purpose of solving the above-mentioned problems, a first aspect of the present disclosure provides a saddle-ride type vehicle including: a power unit having a cylinder arranged upward; and a vehicle body frame supporting the power unit, in which the cylinder includes a cylinder head and a cylinder head cover that covers an upper portion of the cylinder head. The vehicle body frame includes a head cover adjoining portion that adjoins the cylinder head cover, with at least a part of the cylinder head cover overlapping the head cover adjoining portion as viewed from a direction along a cylinder axis that is a center axis of the cylinder. The head cover adjoining portion extends rearward such that the cylinder head cover is exposed outside in a side view.

A second aspect of the present disclosure provides the saddle-ride type vehicle with a seat that allows an occupant to be seated. A pair of the left and right head cover adjoining portions are provided and disposed below the seat.

A third aspect of the present disclosure provides the saddle-ride vehicle with an outer wall on an outside of each head cover adjoining portion in a vehicle width direction. The outer wall includes a chamfer inclining inward in the vehicle width direction toward a lower side thereof.

In a fourth aspect of the present disclosure, the vehicle body frame of the saddle-ride type vehicle includes a seat rail for supporting the seat. The head cover adjoining portions are portions of the seat rail, with the portions adjoining the cylinder head cover.

In a fifth aspect of the present disclosure, the cylinder head cover of the saddle-ride type vehicle includes a cylinder head cover body that covers the upper portion of the cylinder head and a flange protruding outward along an outer periphery of the cylinder head cover body as viewed from the direction along the cylinder axis. At least a part of the flange overlaps the head cover adjoining portion as viewed from the direction along the cylinder head axis.

In a sixth aspect of the present disclosure the saddle-ride type vehicle includes a power unit having a V-type engine with a rear cylinder inclining rearward and upward as the cylinder.

According to the first aspect of the present disclosure, at least a part of the cylinder head cover overlaps the head cover adjoining portion of the vehicle body frame as viewed from the direction along the cylinder axis. This makes it possible to reduce the left-right width of the vehicle body frame compared to the case where the cylinder head cover does not overlap the head cover adjoining portion as viewed from the direction along the cylinder axis (for example, the cylinder head cover is arranged inside the pair of head cover adjoining portions in the vehicle width direction). In addition, since the head cover adjoining portion extends rearward such that the cylinder head cover is exposed outside in the side view, when the cylinder head cover is attached to or detached from the cylinder head, the cylinder head cover can be attached to or detached from the left or right side. This improves the ease of mounting and dismounting for the occupant by reducing the left-right width of the vehicle body frame while allowing the cylinder head cover to be attachable and detachable.

According to the second aspect of the present disclosure, the saddle-ride vehicle further includes the seat that allows the occupant to be seated on, in which the pair of left and right head cover adjoining portions are provided and disposed below the seat. This makes it possible to reduce the left-right width of the head cover adjoining portions to improve the ease of mounting and dismounting. In addition, reducing the left-right width of the head cover adjoining portions helps the occupant to knee-grip the vehicle, which makes it easy to keep the riding posture while traveling and improves the maneuverability.

According to the third aspect of the present disclosure, the outer wall on the outside of each head cover adjoining portion in the vehicle width direction includes the chamfer inclining inward in the vehicle with direction toward the lower side thereof. As a result, each outer wall has a shape fitting to the legs of the occupant, which improves the ease of mounting and dismounting.

According to the fourth aspect of the present disclosure, the head cover adjoining portion is a portion of the seat rail, the portion adjoining the cylinder head cover. This makes it possible to reduce the left-right width of the seat rail to improve the ease of mounting and dismounting and the maneuverability.

According to the fifth aspect of the present disclosure, the cylinder head cover includes a cylinder head cover body for covering the upper portion of the cylinder head and a flange protruding outward along an outer periphery of the cylinder head cover body as viewed from the direction along the cylinder axis, and at least a part of the flange overlaps the head cover adjoining portion as viewed from the direction along the cylinder axis. As a result, since a gap between the head cover adjoining portion and the flange is created, the cylinder head cover can be moved by a large amount along the direction along the cylinder axis when the cylinder head cover is attached to or detached from the cylinder head, compared to the case where the cylinder head cover does not includes the flange. This makes it easy to attach and detach the cylinder head cover and improves the maintainability.

Moreover, since it is possible to bring the head cover adjoining portions and the cylinder head cover as close as possible to each other in the vehicle width direction, the left-right width of the head cover adjoining portions can be reduced more. As a result, in the case where the pair of the left and right head cover adjoining portions are provided and disposed below the seat, the ease of mounting and dismounting can be improved more. Moreover, the occupant can knee-grip the vehicle more easily, which makes it easier to keep the riding posture and improves the maneuverability more.

According to the sixth aspect of the present disclosure, the power unit includes a V-type engine having a rear cylinder inclining rearward and upward as the cylinder.

This makes it possible to reduce the left-right width of the vehicle body frame in the structure including the V-type engine, while allowing the cylinder head cover to be attachable and detachable.

BRIEF DESCRIPTION OF THE DRAWINGS

FIG. 7 is a cross-sectional view taken along a line VII-VII in FIG. 6.

DETAILED DISCLOSURE

Figure 1:
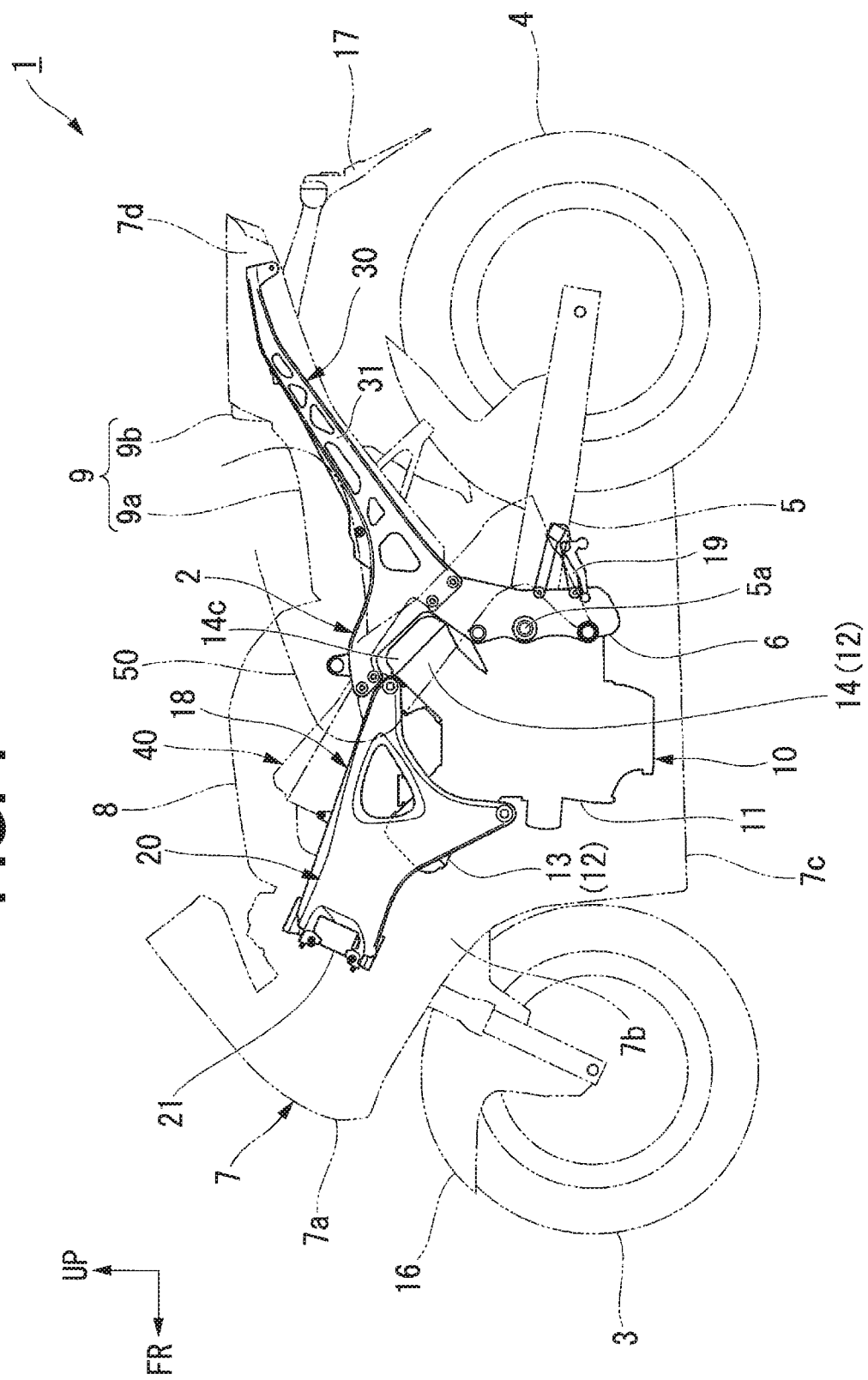
FIG. 1 is a left-side view of a motorcycle as an example of the disclosed saddle-ride type vehicle.

An exemplary approach of the present disclosure will be described below with reference to the drawings. Note that in descriptions below, directions such as front, rear, left, and right are identical to those directions of a vehicle described below unless otherwise noted. In addition, the drawings used for the descriptions below include an arrow FR indicating the vehicle front direction, an arrow LH indicating the vehicle left direction, an arrow UP indicating the vehicle upper direction, and a vehicle left-right center line CL at appropriate positions in the drawings.

FIG. 1 illustrates a motorcycle 1 as an example of a saddle-ride type vehicle. Referring to FIG. 1, the motorcycle 1 includes a front wheel 3 steered by a handlebar (not illustrated), and a rear wheel 4 driven by a power unit 10 including a V-type four-cylinder engine. Hereinafter, the motorcycle may be simply referred to as a "vehicle."

Parts for a steering system including the handlebar and the front wheel 3 are pivotally supported to be steerable by a head pipe 21 formed at a front end of a vehicle body frame 2 (specifically, the inside of a head box 20 provided at the front end of the vehicle body frame 2). In the head pipe 21, a handlebar steering shaft (not illustrated) connected to the handlebar is inserted. The power unit 10 is disposed at the center in the front-rear direction of the vehicle body frame 2. At a rear portion of the power unit 10, a pair of left and right swingarms 5 is pivotally supported to be swingable in the vertical direction about a pivot axis 5a. Between front portions of the left and right swingarms 5 and a rear portion of the vehicle body frame 2, rear suspensions (not illustrated) are disposed.

For example, the vehicle body frame 2 is formed by integrally joining several types of steel materials by welding or another technique. The vehicle body frame 2 includes: a main frame 18 having a pair of left and right front side frames 22L and 22R that first extend rearward and downward from the head box 20 having the head pipe 21 and then extend diverging with one rearward and the other downward; a seat rail 30 having a pair of left and right rear side frames 31 front ends of which are connected to rear ends of the main frame 18, and which first extend rearward and downward from the front ends thereof and then extend rearward and upward, and rear ends of which are joined to each other; and a pair of left and right pivot plates 6 that are connected to front lower ends of the left and right rear side frames 31 and extend downward.

Figure 2:
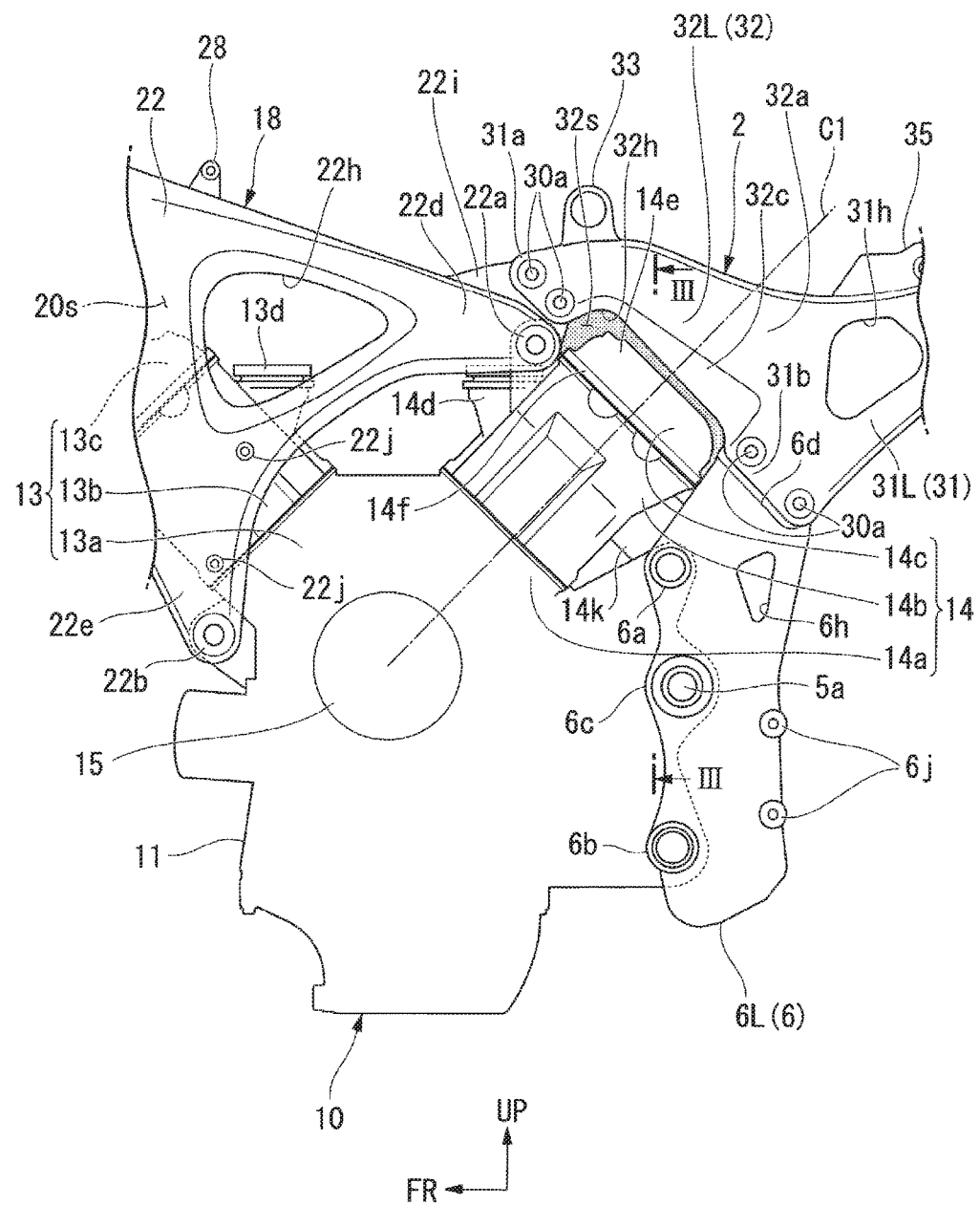
FIG. 2 is a left-side view illustrating a vicinity of a power unit of the motorcycle.

The vehicle body frame 2 is divided into the main frame 18 as a vehicle front frame including the head box 20, the seat rail 30 as a vehicle rear frame, and the left and right pivot plates 6 as vehicle lower frames. Referring to FIG. 2 in addition, the vehicle body frame 2 is integrated into a body by fastening and fixing the main frame 18 and the seat rail 30 with fasteners 30a such as bolts as well as by fastening and fixing the seat rail 30 and the left and right pivot plates 6 with the fasteners 30a such as bolts.

The power unit 10 is fixed to the pair of left and right pivot plates 6 as well as the rear ends and lower ends of the main frame 18. The power unit 10 includes a crankcase 11 and a cylinder portion 12 arranged at an upper portion of the crankcase 11 and having a V shape in a side view. Note that a reference numeral 15 in FIG. 2 indicates a generator cover attached on a left side of the crankcase 11.

The cylinder portion 12 includes a front cylinder 13 and a rear cylinder 14 that are disposed with an interval in the front-rear direction. The front cylinder 13 protrudes forward and upward from the upper portion of the crankcase 11 and the rear cylinder 14 protrudes rearward and upward from the upper portion of the crankcase 11. Note that the rear cylinder 14 corresponds to a "cylinder" recited in claims.

Referring to FIG. 2 in addition, the front cylinder 13 includes a front cylinder block 13a integrally formed at a front upper portion of the crankcase 11, a front cylinder head 13b attached to an upper end of the front cylinder block 13a, and a front cylinder head cover 13c attached to an upper end of the front cylinder head 13b.

The rear cylinder 14 includes a rear cylinder block 14a integrally formed at a rear upper portion of the crankcase 11, a rear cylinder head 14b attached to an upper end of the rear cylinder block 14a, and a rear cylinder head cover 14c attached to an upper end of the rear cylinder head 14b. Note that the rear cylinder head 14b corresponds to a "cylinder head" recited in claims, and the rear cylinder head cover 14c corresponds to a "cylinder head cover" recited in claims.

A front intake port 13d is formed on a rear side of the front cylinder head 13b, and a rear intake port 14d is formed on a front side of the rear cylinder head 14b. A reference numeral C1 in the drawing indicates a rear cylinder axis which is a center axis of the rear cylinder 14. The rear cylinder axis C1 inclines rearward with respect to the vehicle vertical direction. Note that the rear cylinder axis C1 corresponds to a "cylinder axis" recited in claims.

Referring to FIGS. 1 and 2 together, a throttle body (not illustrated) that is connected to the front and rear intake ports 13d and 14d and adjusts an intake amount is provided above the power unit 10 (specifically, between the rear side of the front cylinder head 13b and the front side of the rear cylinder head 14b). An air cleaner box 40 that supplies intake air to the power unit 10 is connected to the head box 20. The air cleaner box 40 purifies the intake air supplied to the throttle body.

An exhaust pipe (not illustrated) is connected to the front cylinder 13. The exhaust pipe extends below the power unit 10 and is connected to a muffler (not illustrated) that is disposed at a right side of the rear wheel 4 and obliquely extends rearward and upward. A fuel tank 8 is disposed above the cylinder portion 12 and between frames of the main frame 18 in the vehicle width direction (specifically, between the left and right front side frames 22L and 22R in the vehicle width direction illustrated in FIG. 5). A seat 9 is disposed at a rear of the fuel tank 8 and on the seat rail 30. The seat 9 includes a seating portion 9a where the driver is seated and a back pad 9b. Note that although the seat 9 is for a single occupant in the present example, a tandem seat may be provided instead.

The vehicle body frame 2 is covered with a vehicle body cover 7. The vehicle body cover 7 includes a front cowl 7a for covering a front portion of the vehicle body frame 2, a front side cowl 7b for covering sides of the front portion of the vehicle body frame 2, an under cowl 7c for covering a lower portion of the vehicle body frame 2, and a rear cowl 7d for covering the rear portion of the vehicle body frame 2.

Note that reference numerals 16, 17, and 19 in FIG. 1 indicate a front fender, a rear fender, and a main step, respectively.

<Head Box>

Figure 5:
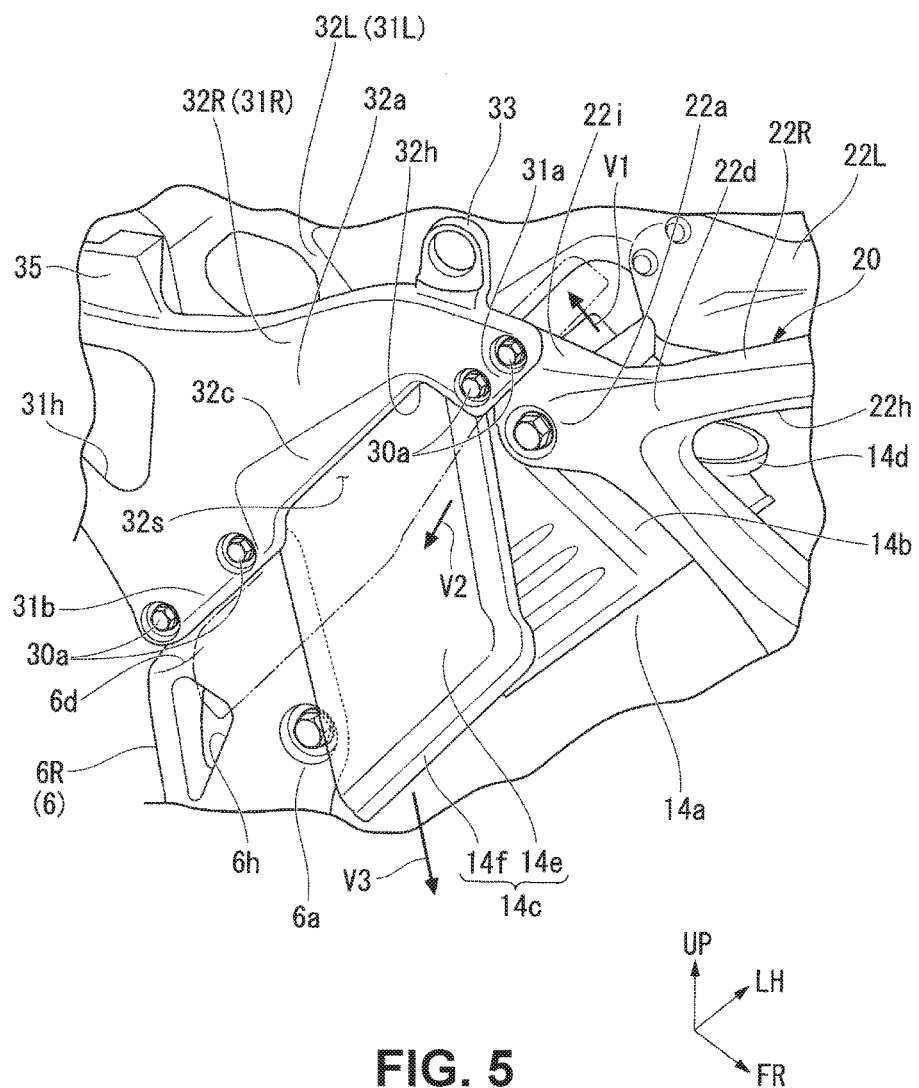
FIG. 5 is a diagram for explaining a method of attaching and detaching the rear cylinder head cover.

Referring to FIGS. 1 and 2 together, the head box 20 forms intake passages 20s taking air from the front of the vehicle into the inside when the vehicle is travelling. The head box 20 forms the head pipe 21 inclined rearward with respect to the vehicle vertical direction in the side view and forms the intake passages 20s at sides of the head pipe 21. A rear end of the head box 20 is connected to the pair of left and right front side frames 22 that first extend rearward and downward from the head pipe 21 and then diverge such that one extends rearward and the other extends downward. Although not illustrated in the drawings, the front side frames 22 are formed in such a way as to diverge in the left and right directions from the head pipe 21 in a top view. In FIG. 5, the reference numerals 22L and 22R indicate the left front side frame and the right front side frame, respectively.

In the side view in FIG. 2, each of the left and right front side frames 22L and 22R has a rear extension 22d that extends rearward such that the vertical width thereof decreases toward a rear side. At the tip (rear end) of the rear extension 22d, a first support 22a is formed, which supports a front upper portion of the rear cylinder 14. At a rear upper portion of the rear extension 22d, a seat rail support 22i is formed, which supports a front upper end of the seat rail 30. In the side view in FIG. 2, the seat rail support 22i is located inside the first support 22a in the vehicle width direction and forms a convex shape that protrudes rearward and upward in such a way as to overlap the front upper portion of the seat rail 30.

In the side view in FIG. 2, each of the left and right front side frames 22L and 22R has a lower extension 22e that extends downward such that the front-rear width thereof decreases toward a lower side. At the tip (lower end) of the lower extension 22e, a second support 22b is formed, which supports a front lower portion of the front cylinder 13 and the front upper portion of the crankcase 11.

At a rear portion of each of the left and right front side frames 22, an opening 22h is formed, which opens in the vehicle width direction. The opening 22h is a through hole that passes through the rear portion of corresponding front side frame. In the side view in FIG. 2, the opening 22h has a triangle shape having rounded corners and has a convex portion pointing at the first support 22a. This makes it possible to reduce the weight of the left and right front side frames 22L and 22R while keeping rigidities thereof.

Although not illustrated in the drawings, outer walls on the outsides of the left and right front side frames 22L and 22R in the vehicle width direction incline inward in the vehicle width direction toward an upper side. Referring to FIG. 2, on the outer walls of the left and right front side frames 22L and 22R, mounting bosses 22j are formed for attaching vehicle parts at the sides of the vehicle front portion such as the front side cowl 7b (see FIG. 1). The multiple mounting bosses 22j, protruding outward in the vehicle width direction from the outer walls of the left and right front side frames 22L and 22R, are disposed with intervals in the front-rear and up-down direction. On upper ends of the left and right front side frames 22L and 22R, mounting protrusions 28 are formed protruding upward for attaching vehicle parts at a vehicle front upper side, such as the fuel tank 8 (see FIG. 1).

<Pivot Plate>

Figure 3:
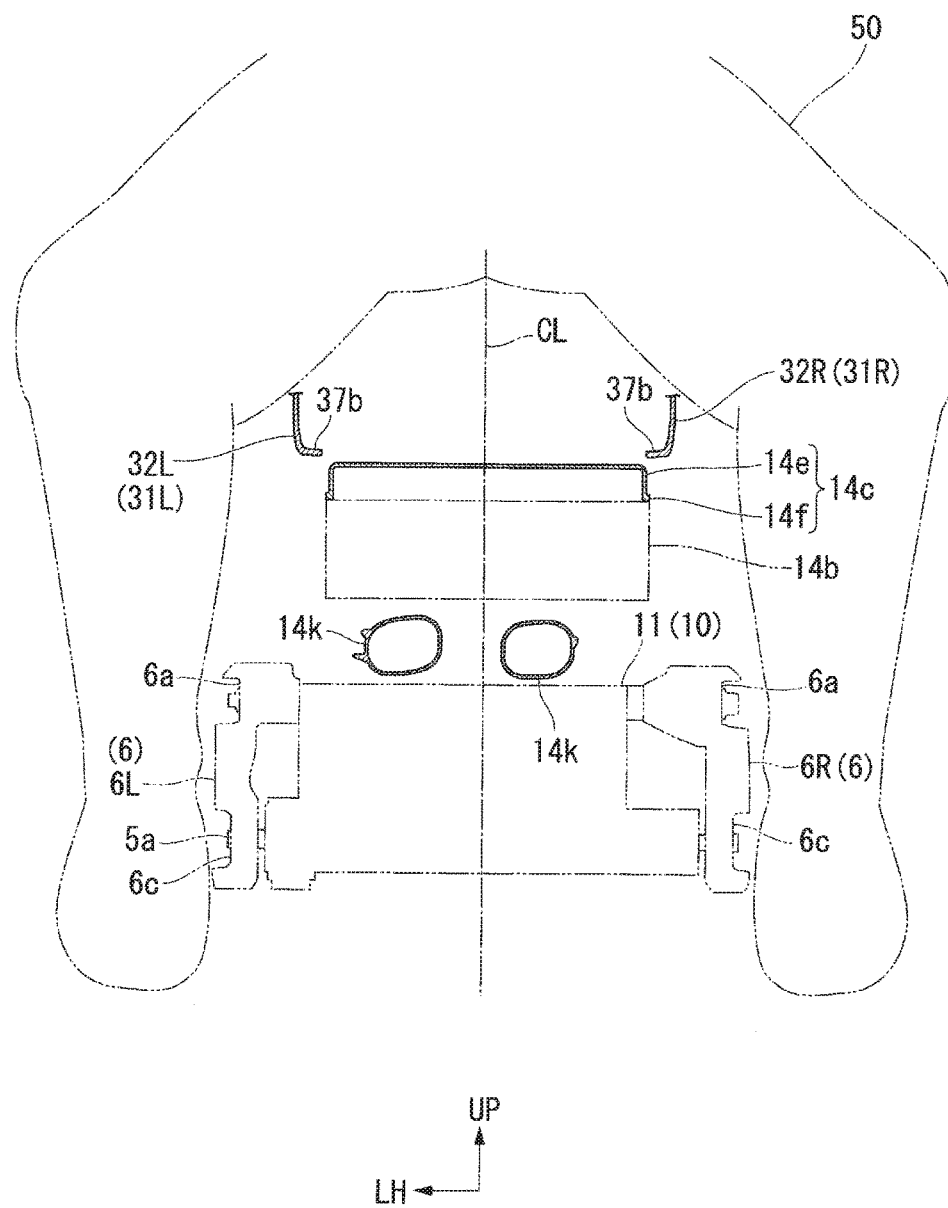
FIG. 3 is a cross-sectional view taken along a line III-III in FIG. 2.

Referring to FIG. 3, the pivot plates 6 are provided, one at each of the left and right sides of the vehicle left-right center line CL. Reference numerals 6L and 6R in the drawing indicate the left pivot plate and the right pivot plate, respectively. Referring to FIG. 2 in addition, the left and right pivot plates 6L and 6R are formed to extend downward from the front lower ends of the left and right rear side frames 31. In the side view in FIG. 2, at a vertically intermediate portion of a front portion of each of the left and right pivot plates 6L and 6R, a pivot axis support 6c is formed, which protrudes forward forming a gentle convex shape and supports the pivot axis 5a. A vertically intermediate portion of a rear portion of the crankcase 11 is supported by the pivot axis 5a.

At a front upper portion of each of the left and right pivot plates 6L and 6R, a first support protrusion 6a is formed, which protrudes forward forming a gentle convex shape and supports the rear upper portion of the crankcase 11. At a front lower portion of each of the left and right pivot plates 6L and 6R, a second support protrusion 6b is formed, which protrudes forward forming a gentle convex shape and supports a rear lower portion of the crankcase 11. In the side view in FIG. 2, the first support protrusion 6a is arranged higher than the pivot axis support 6c, and the second support protrusion 6b is arranged lower than the pivot axis support 6c. In the side view in FIG. 2, the positions in the front-rear direction of front ends of the first support protrusion 6a and the second support protrusion 6b are arranged to be the same as that of the pivot axis support 6c.

In the present example, the power unit 10 is supported at five points by the vehicle body frame 2 and other parts. Specifically, of the power unit 10, a front upper portion of the rear cylinder head 14b is supported by the first supports 22a of the left and right front side frames 22L and 22R, a front lower portion of the front cylinder head 13b and the front upper portion of the crankcase 11 are supported by the second supports 22b of the left and right front side frames 22L and 22R, the vertically intermediate portion of the rear portion of the crankcase 11 is supported by the pivot axis 5a, the rear upper portion of the crankcase 11 is supported by the first support protrusions 6a of the left and right pivot plates 6L and 6R, and the rear lower portion of the crankcase 11 is supported by the second support protrusions 6b of the left and right pivot plates 6L and 6R.

At a rear upper end of each of the left and right pivot plates 6L and 6R, a recess forming portion 6d is formed, which forms a recess which is recessed inward in the vehicle width direction and in which a front lower end of each of the left and right rear side frames 31 is placed. In the side view in FIG. 2, a portion of the recess forming portion 6d opposing each front lower end of the left and right rear side frames 31 inclines to become lower toward the rear side along a front lower end face (a front inclined face) of corresponding front lower end of the left and right rear side frames 31.

At a rear upper portion of each of the left and right pivot plates 6L and 6R, an opening 6h is formed, which opens in the vehicle width direction. The opening 6h is a through hole that passes through the rear upper portions of the left and right pivot plates 6L and 6R in the vehicle width direction. The opening 6h is arranged at a rear side of the first support protrusion 6a and a lower side of the recess forming portion 6d. In the side view in FIG. 2, the opening 6h has a triangle shape having rounded corners and a convex portion pointing downward. This makes it possible to reduce the weight of the left and right pivot plates 6L and 6R while keeping rigidities thereof.

Note that in FIG. 2, a reference numeral 6j indicates main step mounting portions for mounting the main step 19 (see FIG. 1).

<Seat Rail>

Figure 6:
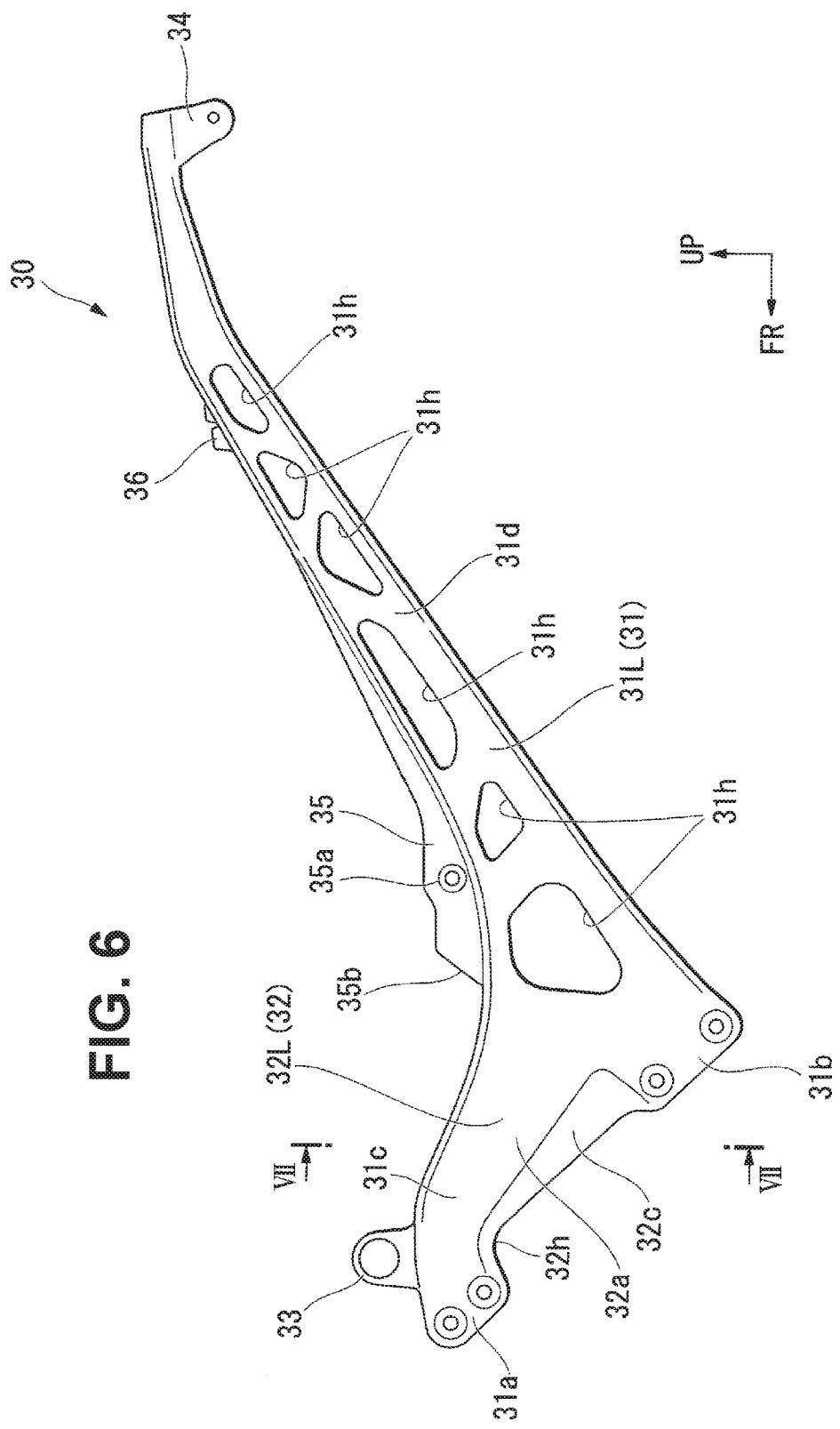
FIG. 6 is a left-side view of a seat rail of the motorcycle.

Referring to FIGS. 2 and 6 together, the seat rail 30 includes the pair of the left and right rear side frames 31, the front ends of which are connected to the rear ends of the main frame 18 (specifically, the seat rail supports 22i), which first extend rearward and downward from the front ends and then extend rearward and upward, and the rear ends of which are joined together. A reference numeral 32 in the drawing indicates head cover adjoining portions of the left and right rear side frames 31 of the seat rail 30, which adjoin the rear cylinder head cover 14c.

Referring FIG. 3 in addition, a pair of the head cover adjoining portions 32 are provided, one at each of left and right sides of the vehicle left-right center line CL as a symmetry axis. Reference numerals 31L and 31R in the drawing indicate the left rear side frame and the right rear side frame, respectively, and reference numerals 32L and 32R in the drawing indicate the left head cover adjoining portion and the right head cover adjoining portion, respectively. Referring to FIG. 1 in addition, the left and right head cover adjoining portions 32L and 32R are arranged at the front lower side of the seat 9. For example, when the driver is seated on the seat 9, the driver's legs 50 (thighs) are close to the left and right head cover adjoining portions 32L and 32R.

In a side view in FIG. 6, each of the left and right rear side frames 31L and 31R includes a front upper extension 31c extending forward and upward such that the vertical width thereof decreases toward the front side; and a rear upper extension 31d, a front end of which links with a rear end of the front upper extension 31c and extends rearward and upward such that the vertical width thereof decreases toward the rear side. The left and right head cover adjoining portions 32L and 32R are portions of the front upper extensions 31c of the left and right rear side frames 31, the portions adjoining the rear cylinder head cover 14c.

Referring to FIGS. 2 and 6 together, each of the left and right rear side frames 31L and 31R includes a first connection 31a that is formed at the tip (front end) of the front upper extension 31c thereof and connected to each seat rail support 22i of the left and right front side frames 22L and 22R. For example, each first connection 31a of the left and right rear side frames 31 and each seat rail support 22i of the left and right front side frames 22L and 22R are fastened and fixed to each other at multiple points (for example, two points in the example) with the fasteners 30a such as bolts.

Referring to FIGS. 2 and 6 together, each of the left and right rear side frames 31L and 31R includes a second connection 31b that is formed at a front lower end thereof (specifically, a lower end of a border between the front upper extension 31c and the rear upper extension 31d) and connected to a rear upper end of each of the left and right pivot plates 6L and 6R. In a cross-sectional view in FIG. 7, each second connection 31b of the left and right rear side frames 31 has a curve that first extends curving outward in the vehicle width direction toward a lower side and then extends downward curving gently. For example, each second connection 31b of the left and right rear side frames 31 and each rear upper end of the left and right pivot plates 6L and 6R are fastened and fixed to each other at multiple points (for example, two points in the example) with the fasteners 30a such as bolts.

In the side view in FIG. 6, a front upper end edge of each of the left and right rear side frames 31L and 31R (specifically, an upper end edge of the front upper extension 31c) has a shape like a hill that first extends to gently ascend toward the rear side from the first connection 31a, then extends curving to gently descend toward the rear side, and reaches a front end of the rear upper extension 31d (specifically, the border between the front upper extension 31c and the rear upper extension 31d).

In the side view in FIG. 6, a rear upper end edge of each of the left and right rear side frames 31L and 31R (specifically, an upper end edge of the rear upper extension 31d) first extends gently curving to ascend toward the rear side from the rear end of the front upper extension 31c (specifically, the border between the front upper extension 31c and the rear upper extension 31d), then extends linearly to ascend toward the rear side, afterward extends rearward and upward while gently curving, and reaches a rear end.

In the side view in FIG. 6, a rear lower end edge of each of the left and right rear side frames 31L and 31R (specifically, a lower end edge of the rear upper extension 31d) first extends linearly to ascend toward the rear side from the rear end of the front upper extension 31c (specifically, the border between the front upper extension 31c and the rear upper extension 31d), then extends rearward and upward while gently curving, and reaches a rear end.

Referring to FIGS. 2 and 6 together, in the side view, each of the left and right head cover adjoining portions 32L and 32R includes a recess 32h formed to be recessed rearward and upward along a shape of the rear cylinder head cover 14c. In the side view in FIG. 2, an outline of a portion where each recess 32h of the left and right head cover adjoining portions 32L and 32R is formed (specifically, a chamfer 32c to be described later) is a size larger than an outline of the rear cylinder head cover 14c. In the side view in FIG. 2, a gap 32s passing through in the vehicle width direction is formed between the rear cylinder head cover 14c and a portion where each recess 32h of the left and right head cover adjoining portions 32L and 32R is formed. In FIG. 2, the gap 32s is indicated by dot hatching for convenience. As shown, a length of the gap 32s between the head cover 14c and the portion where the portion where the recesses 32h are formed is smaller than a height of the cylinder head cover in the direction of the cylinder axis in a side view, or in other words the gap is narrower than the height of the cylinder head cover in the direction of the cylinder axis in the side view.

Referring to FIGS. 1 and 6 together, a mounting protrusion 33 is formed protruding upward at a front upper end of each front upper extension 31c of the left and right rear side frames 31L and 31R for attaching vehicle parts such as the fuel tank 8 at an upper side of an intermediate portion in the vehicle front-rear direction. A rear side frame joining portion 34 is formed protruding downward at a rear end of each rear upper extension 31d of the left and right rear side frames 31L and 31R for joining the left and right rear side frames 31L and 31R.

Referring to FIGS. 1 and 6 together, a gusset 35 is formed at an upper end of a front portion of each rear upper extension 31d in the left and right rear side frames 31L and 31R, the gusset 35 having a mounting portion 35a for attaching vehicle parts such as the seat 9 at a rear side of the vehicle. In the side view in FIG. 6, the gusset 35 protrudes upward from the upper end of the front portion of each rear upper extension 31d in the left and right rear side frames 31L and 31R and extends rearward and upward along a rear upper end edge of the left and right rear side frames 31 (specifically, the upper end edge of the rear upper extension 31d) such that the vertical width decreases toward the rear side.

Referring to FIGS. 1 and 6 together, a mounting portion 36 is formed protruding upward at an upper end of a rear portion of each rear upper extension 31d in the left and right rear side frames 31L and 31R for attaching vehicle parts such as the seat 9 at the rear side of the vehicle.

Referring to FIG. 6, multiple (six in the example) openings 31h that open in the vehicle width direction are formed in each rear upper extension 31d in the left and right rear side frames 31L and 31R. The openings 31h are through holes that pass through the rear upper extensions 31d of the left and right rear side frames 31L and 31R in the vehicle width direction. In the side view in FIG. 6, the openings 31h have a triangle or trapezoid shape having rounded corners. Each of the multiple openings 31h are arranged such that an oblique line of the triangle, or an upper or lower base of the trapezoid are in parallel with an upper or lower end edge of a rear side of each of the left and right rear side frames 31 (specifically, an upper or lower end edge of the rear upper extension 31d). In other words, the multiple openings 31h are arranged such that each rear upper extension 31d in the left and right rear side frames 31L and 31R has a truss structure (specifically, Warren truss). This makes it possible to reduce the weight of the left and right rear side frames 31L and 31R while keeping rigidities thereof.

In the cross-sectional view in FIG. 7, an outer wall 32a on the outside of each of the left and right head cover adjoining portions 32L and 32R in the vehicle width direction gently inclines inward in the vehicle width direction toward the upper side. An upper end of the outer wall 32a is linked smoothly to a first rib 37a protruding inward in the vehicle width direction and extending along a front upper end edge of each of the left and right rear side frames 31 (specifically, the upper end edge of the front upper extension 31c). The outer wall 32a includes the chamfer 32c to be described later. A lower end edge of the chamfer 32c is linked smoothly to a second rib 37b protruding inward in the vehicle width direction and extending along a front lower end edge of each of the left and right rear side frames 31 (specifically, a lower end edge of the front upper extension 31c).

In the cross-sectional view in FIG. 7, a rib 35r is formed at a front portion of each gusset 35 in the left and right rear side frames 31L and 31R. The rib 35r is formed along a front inclined face (see. FIG. 6) of the gusset 35 and protrudes inward in the vehicle width direction such that the vertical width decreases toward the inside in the vehicle width direction. The rib 35r extends such that a front lower end thereof is linked to the first rib 37a.

In the cross-sectional view in FIG. 7, a third rib 37c is formed at each of the left and right head cover adjoining portions 32L and 32R, the third rib 37c protruding inward in the vehicle width direction, inclining such that an inner end in the vehicle width direction is positioned more outward toward the lower side, and extending to be linked with the first rib 37a, the rib 35r, and the second rib 37b. This makes it possible to improve rigidities of the left and right head cover adjoining portions 32L and 32R while keeping a rigidity of the gusset 35.

Note that a reference numeral 31i in the drawing indicates a mounting portion protruding inward in the vehicle width direction from each gusset 35 in the left and right rear side frames 31L and 31R for attaching vehicle parts such as the seat 9 at the rear side of the vehicle. A reference numeral 31j in FIG. 7 indicates a mounting boss protruding inward in the vehicle width direction from each of the left and right head cover adjoining portions 32L and 32R for attaching vehicle parts located below the seat 9.

Referring to FIGS. 6 and 7 together, the chamfer 32c is formed at the portion where each recess 32h of the left and right head cover adjoining portions 32L and 32R is formed. In the cross-sectional view in FIG. 7, the chamfer 32c inclines to be positioned inward in the vehicle width direction toward the lower side (specifically, toward a rear cylinder head cover 14c side illustrated in FIG. 2) and to curve in the vehicle front-rear direction inward in the vehicle width direction. This makes it possible to form designed surfaces of the left and right head cover adjoining portions 32L and 32R, thereby improving the appearance of the left and right rear side frames 31L and 31R (particularly, around the rear cylinder head cover 14c).

<Arrangement and Structure of Rear Cylinder Head Cover>

Figure 4:
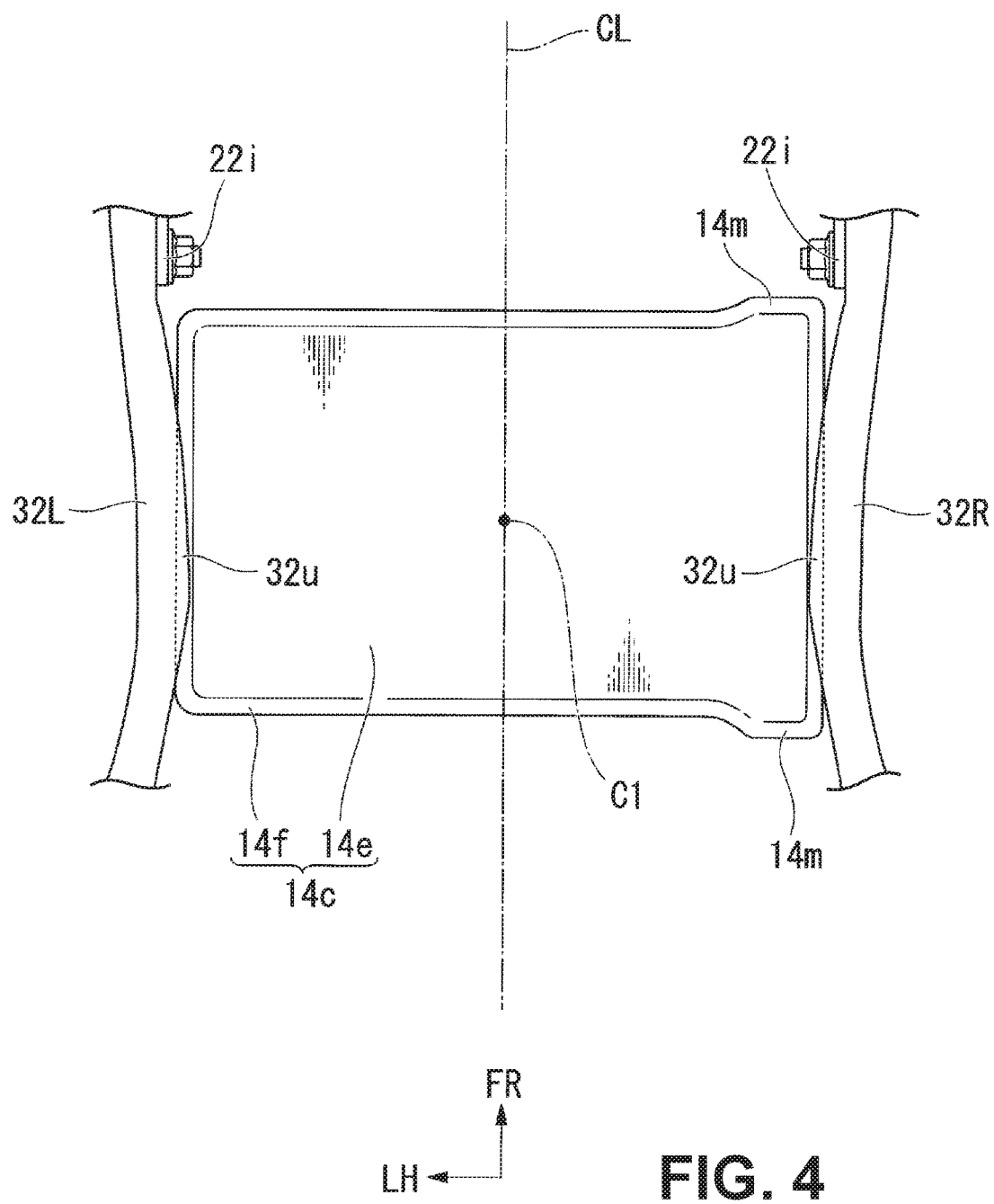
FIG. 4 is a diagram illustrating a vicinity of a rear cylinder head cover of the motorcycle as viewed from a direction parallel to a rear cylinder axis.

Referring to FIGS. 2 and 4 together, the rear cylinder head cover 14c includes a cylinder head cover body 14e for covering the upper portion of the rear cylinder head 14b and a flange 14f protruding along the outer periphery of the cylinder head cover body 14e as viewed from a direction along the rear cylinder axis C1. In the direction along the rear cylinder axis C1, the flange 14f is formed on a portion of the rear cylinder head cover 14c, the portion being close to the upper portion of the rear cylinder head 14b.

Referring to FIG. 4, the rear cylinder head cover 14c has a rectangular shape extending in the vehicle width direction as viewed from the direction along the rear cylinder axis C1. As viewed from the direction along the rear cylinder axis C1, bulges 14m slightly bulging in the front and rear directions are formed at the right end of the rear cylinder head cover 14c. As viewed from the direction along the rear cylinder axis C1, the cylinder head cover body 14e has a rectangular shape extending in the vehicle width direction, which is a size smaller than the rear cylinder head cover 14c. As viewed from the direction along the rear cylinder axis C1, the flange 14f has the same outline as that of the rear cylinder head cover 14c and has a rectangular frame shape extending in the vehicle width direction. As viewed from the direction along the rear cylinder axis C1, a curve 32U is formed at an intermediate portion in each of the front-rear direction of the left and right head cover adjoining portions 32L and 32R, the curve 32U gently curving to form a gentle convex shape facing inside in the vehicle width direction.

Referring to FIG. 4, as viewed from the direction along the rear cylinder axis C1, outer ends in the vehicle width direction of the rear cylinder head cover 14c overlap the left and right head cover adjoining portions 32L and 32R. Specifically, as viewed from the direction along the rear cylinder axis C1, intermediate portions in the front-rear direction of outer ends in the vehicle width direction of the flange 14f overlap the curves 32u of the left and right head cover adjoining portions 32L and 32R.

Referring to FIG. 2, in the side view, the rear cylinder head cover 14c does not overlap the left and right head cover adjoining portions 32L and 32R and is exposed outside. Specifically, the gap 32s is formed between each chamfer 32c of the left and right head cover adjoining portions 32L and 32R and the rear cylinder head cover 14c. In the side view, an interval in the gap 32s (specifically, a distance between the outline of the chamfer 32c and the outline of the rear cylinder head cover 14c in the direction of the normal to the outline of the chamfer 32c in the side view) is largest at a lower side of each first connection 31a of the left and right rear side frames 31.

<Method of Attaching and Detaching Rear Cylinder Head Cover>

Referring to FIG. 5, when the rear cylinder head cover 14c is detached from the rear cylinder head 14b, first, fasteners (not illustrated) that fasten the rear cylinder head cover 14c and the rear cylinder head 14b are removed. Next, referring to FIGS. 2 and 5 together, the rear cylinder head cover 14c is lifted rearward and upward in the direction along the rear cylinder axis C1 (the direction of an arrow V1 in FIG. 5). Then, the rear cylinder head cover 14c is slid rightward in the vehicle width direction (the direction of an arrow V2 in FIG. 5) to pass through the gap 32s. After that, the rear cylinder head cover 14c is inclined and moved rightward and downward (the direction of an arrow V3 in FIG. 5). Accordingly, the rear cylinder head cover 14c can be detached from the rear cylinder head 14b. Note that when the rear cylinder head cover 14c is attached to the rear cylinder head 14b, the rear cylinder head cover 14c can be attached to the rear cylinder head 14b by performing a process in reverse order to the above detaching process. Although the description has been provided for the method of attaching and detaching the rear cylinder head cover 14c rightward in the vehicle width direction as above, the rear cylinder head cover 14c can be attached and detached leftward in the vehicle width direction in the same manner.

As described above, in the example, the motorcycle 1 includes: the power unit 10 having the rear cylinder 14 arranged rearward and upward; and the vehicle body frame 2 supporting the power unit 10, in which the rear cylinder 14 includes the rear cylinder head 14b and the rear cylinder head cover 14c for covering the upper portion of the rear cylinder head 14b, the vehicle body frame 2 includes the head cover adjoining portion 32 that adjoins the rear cylinder head cover 14c, at least a part of the rear cylinder head cover 14c overlaps the head cover adjoining portion 32 as viewed from the direction parallel to the rear cylinder axis C1 that is the center axis of the rear cylinder 14, and the rear cylinder head cover 14c does not overlap the head cover adjoining portion 32 in the side view.

According to the structure described above, at least a part of the rear cylinder head cover 14c overlaps the head cover adjoining portion 32 of the vehicle body frame 2 as viewed from the direction parallel to the rear cylinder axis C1. This makes it possible to reduce the left-right width of the vehicle body frame 2 compared to the case where the rear cylinder head cover 14c does not overlap the head cover adjoining portion 32 as viewed from the direction parallel to the rear cylinder axis C1 (for example, the rear cylinder head cover 14c is arranged inside the pair of the head cover adjoining portions 32) in the vehicle width direction. In addition, since the head cover adjoining portion 32 extends rearward such that the rear cylinder head cover 14c is exposed outside in the side view, when the rear cylinder head cover 14c is attached to or detached from the rear cylinder head 14b, the rear cylinder head cover 14c can be attached to or detached from the left or right side. This makes it possible to reduce the left-right width of the vehicle body frame 2 while allowing the rear cylinder head cover 14c to be attachable and detachable.

In addition, in the above example, the saddle-ride vehicle further includes the seat 9 that allows the occupant to be seated on, in which the pair of left and right head cover adjoining portions 32 are provided and disposed below the seat 9. This makes it possible to reduce the left-right width of the head cover adjoining portions 32 to improve the ease of mounting and dismounting. In addition, reducing the left-right width of the head cover adjoining portions 32 helps the occupant to knee-grip the vehicle, which makes it easy to keep the riding posture while traveling and improves the maneuverability.

In addition, in the above example, the outer wall 32a on the outside of each head cover adjoining portion 32 in the vehicle width direction includes the chamfer 32c inclining inward in the vehicle width direction toward the lower side thereof. As a result, each outer wall 32a has a shape fitting to the legs 50 (see FIGS. 1 and 3) of the occupant, which improves the ease of mounting and dismounting.

In addition, in the above example, the head cover adjoining portion 32 is a portion of the seat rail 30, the portion adjoining the rear cylinder head cover 14c. This makes it possible to reduce the left-right width of the seat rail 30 to improve the ease of mounting and dismounting and the maneuverability.

In addition, in the above example, the rear cylinder head cover 14c includes the cylinder head cover body 14e for covering the upper portion of the rear cylinder head 14b and the flange 14f protruding outward along the outer periphery of the cylinder head cover body 14e as viewed from the direction parallel to the rear cylinder axis C1, and at least a part of the flange 14f overlaps the head cover adjoining portion 32 as viewed from the direction parallel to the rear cylinder axis C1. As a result, since the gap between the head cover adjoining portion 32 and the flange 14f is created, the rear cylinder head cover 14c can be moved by a large amount along the direction parallel to the rear cylinder axis C1 when the rear cylinder head cover 14c is attached to or detached from the rear cylinder head 14b, compared to the case where the rear cylinder head cover 14c does not includes the flange 14f. This makes it easy to attach and detach the rear cylinder head cover 14c and improves the maintainability.

Moreover, since it is possible to bring the head cover adjoining portions 32 and the rear cylinder head cover 14c as close as possible to each other in the vehicle width direction, the left-right width of the head cover adjoining portions 32 can be reduced more. As a result, in the case where the pair of the left and right head cover adjoining portions 32 are provided and disposed below the seat 9, the ease of mounting and dismounting can be improved more. Moreover, the occupant can knee-grip the vehicle more easily, which makes it easier to keep the riding posture and improves the maneuverability more.

In addition, in the above example, the power unit 10 includes the V-type engine having the rear cylinder 14 inclining rearward and upward as the cylinder. This makes it possible to reduce the left-right width of the vehicle body frame 2 in the structure including the V-type engine, while allowing the rear cylinder head cover 14c to be attachable and detachable.

Note that although in the above example, the descriptions have been provided for the example in which the pair of the left and right head cover adjoining portions 32 are provided, the present disclosure is not limited thereto. For example, the head cover adjoining portion 32 may be provided at only one of the left and right sides.

Although in the above example, the descriptions have been provided for the example in which the head cover adjoining portions 32 are disposed below the seat 9, the present disclosure is not limited thereto. For example, the head cover adjoining portions 32 do not need to be disposed below the seat 9.

Although in the above example, the descriptions have been provided for the example in which the outer wall 32a on the outside of the head cover adjoining portion 32 in the vehicle width direction inclines inward in the vehicle width direction toward the upper side, the present disclosure is not limited thereto. For example, the outer wall 32a on the outside of the head cover adjoining portion 32 in the vehicle width direction may incline inward in the vehicle width direction toward the lower side, or may be formed linearly in parallel with the vehicle vertical direction.

Although in the above example, the descriptions have been provided for the example in which the head cover adjoining portion 32 is a portion of the seat rail 30, the portion adjoining the rear cylinder head cover 14c, the present disclosure is not limited thereto. For example, the head cover adjoining portion 32 may be a portion of another frame other than the seat rail 30 (specifically, a portion of the vehicle body frame 2 excluding the seat rail 30), the portion adjoining the cylinder head cover 14c.

Although in the above example, the descriptions have been provided for the example in which the vehicle body frame 2 is divided into the main frame 18 as the vehicle front frame and the seat rail 30 as the vehicle rear frame (divided into front and rear parts), the present disclosure is not limited thereto. For example, the vehicle body frame 2 does not need to be divided into front and rear parts. In other words, the vehicle body frame 2 may be a body including the front and rear portions. In addition, the present disclosure is not limited to the case where the main frame 18 includes the head box 20, and the main frame 18 does not need to include the head box 20.

Note that the present disclosure is not limited to the above example, and, for example, the saddle-ride type vehicle includes various kinds of vehicles that a driver rides astride of, such as not only motorcycles (including motor-assisted bicycles and scooter type vehicles) but also three-wheeled vehicles (including one front wheel and two rear wheels types as well as two front wheels and one rear wheel types). In addition, the present disclosure is applicable to not only motorcycles but also four-wheeled vehicles such as automobiles.

Although the engine in the example is a V-type four-cylinder engine, the engine may be a two-cylinder engine, for example. The engine may be one including a cylinder inclined rearward. The engine does not need to be what is called a transverse engine, which is mounted such that the crankshaft is parallel to the vehicle width direction. The engine may be what is called a longitudinal engine, which is mounted such that the crankshaft is parallel to the vehicle front-rear direction, and the cylinder arrangement in this case may also include various types. In addition, the power unit 10 may be one that includes an electric motor in the drive source.

The structure in the above example is an example of the present disclosure, and various modifications can be made without departing from the spirit of the present disclosure, such as replacing a constituent in the example with a known constituent.

The invention claimed is:

1. A saddle-ride type vehicle comprising:
   a power unit having a cylinder arranged upward; and
   a vehicle body frame supporting the power unit,
   wherein:
      the cylinder includes a cylinder head and a cylinder head cover that covers an upper portion of the cylinder head,
      the vehicle body frame is divided into a main frame as a vehicle front frame and a seat rail as a vehicle rear frame,
      the seat rail is fixed on a front side and a rear side thereof in a front-rear direction of the vehicle above the cylinder head cover with respect to a cylinder axis which is a center axis of the cylinder,
      the seat rail has a head cover adjoining portion that is adjacent so as to straddle over the cylinder head cover,
      at least a part of the cylinder head cover overlaps the head cover adjoining portion as viewed from a direction along the cylinder axis,
      the head cover adjoining portion extends rearward such that the cylinder head cover is exposed outside in a side view,
      a gap is formed between the head cover adjoining portion and the cylinder head cover in a side view, and
      the gap is narrower than a height of the cylinder head cover in the direction of the cylinder axis in a side view.

2. The saddle-ride type vehicle according to claim 1, further comprising a seat that allows an occupant to be seated,
   wherein the head cover adjoining portion of the seat rail is divided into left and right head cover adjoining portions which are provided and disposed below the seat.

3. The saddle-ride type vehicle according to claim 2, wherein the seat rail supports the seat, and
   the head cover adjoining portions of the seat rail adjoin the cylinder head cover.

4. The saddle-ride type vehicle according to claim 3, wherein the cylinder head cover includes a cylinder head cover body that covers the upper portion of the cylinder head and a flange protruding outward along an outer periphery of the cylinder head cover body as viewed from the direction along the cylinder axis, and
   at least a part of the flange overlaps the head cover adjoining portions as viewed from the direction along the cylinder head axis.

5. The saddle-ride type vehicle according to claim 4, wherein the power unit includes a V-type engine having a rear cylinder inclining rearward and upward as the cylinder.

6. The saddle-ride type vehicle according to claim 2, wherein an outer wall on an outside of each of the head cover adjoining portions in a vehicle width direction includes a chamfer inclining inward in the vehicle width direction toward a lower side thereof.

7. The saddle-ride type vehicle according to claim 6,
wherein the seat rail supports the seat, and the head cover adjoining portions of the seat rail adjoin the cylinder head cover.

8. The saddle-ride type vehicle according to claim 7,
wherein the cylinder head cover includes a cylinder head cover body that covers the upper portion of the cylinder head and a flange protruding outward along an outer periphery of the cylinder head cover body as viewed from the direction along the cylinder axis, and
at least a part of the flange overlaps the head cover adjoining portions as viewed from the direction along the cylinder head axis.

9. The saddle-ride type vehicle according to claim 8, wherein the power unit includes a V-type engine having a rear cylinder inclining rearward and upward as the cylinder.

10. The saddle-ride type vehicle according to claim 6,
wherein the cylinder head cover includes a cylinder head cover body that covers the upper portion of the cylinder head and a flange protruding outward along an outer periphery of the cylinder head cover body as viewed from the direction along the cylinder axis, and
at least a part of the flange overlaps the head cover adjoining portions as viewed from the direction along the cylinder head axis.

11. The saddle-ride type vehicle according to claim 1,
wherein the cylinder head cover includes a cylinder head cover body that covers the upper portion of the cylinder head and a flange protruding outward along an outer periphery of the cylinder head cover body as viewed from the direction along the cylinder axis, and
at least a part of the flange overlaps the head cover adjoining portion as viewed from the direction along the cylinder head axis.

12. The saddle-ride type vehicle according to claim 1, wherein the power unit includes a V-type engine having a rear cylinder inclining rearward and upward as the cylinder.

13. The saddle-ride type vehicle according to claim 2,
wherein the cylinder head cover includes a cylinder head cover body that covers the upper portion of the cylinder head and a flange protruding outward along an outer periphery of the cylinder head cover body as viewed from the direction along the cylinder axis, and
at least a part of the flange overlaps the head cover adjoining portions as viewed from the direction along the cylinder head axis.

14. The saddle-ride type vehicle according to claim 13, wherein the power unit includes a V-type engine having a rear cylinder inclining rearward and upward as the cylinder.

* * * * *